UNITED STATES PATENT OFFICE.

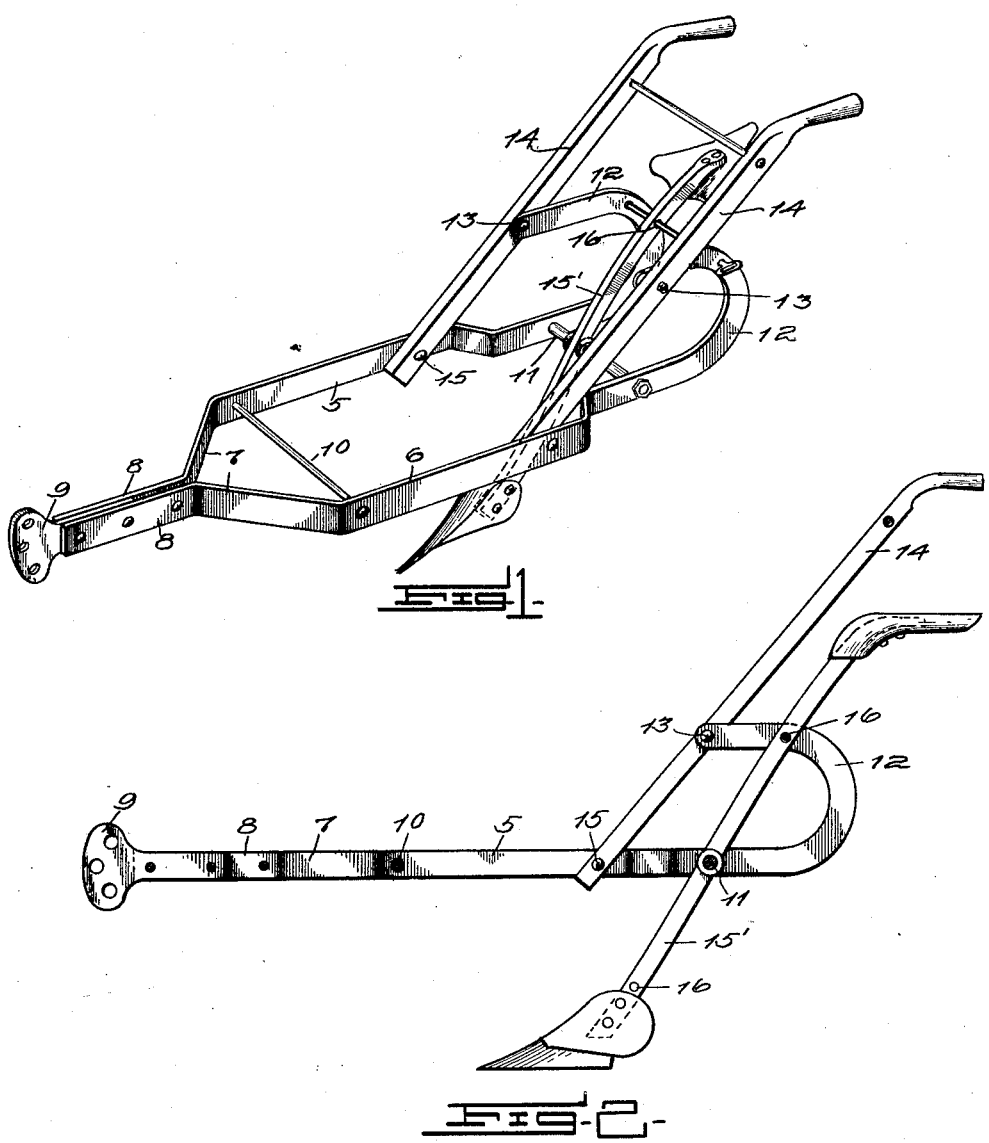

JAMES W. P. HILL, OF NEBO, NORTH CAROLINA.

REVERSIBLE PLOW.

1,114,692.   Specification of Letters Patent.   Patented Oct. 20, 1914.

Application filed February 18, 1914. Serial No. 819,501.

*To all whom it may concern:*

Be it known that I, JAMES W. P. HILL, a citizen of the United States of America, residing at Nebo, in the county of McDowell and State of North Carolina, have invented certain new and useful Improvements in Reversible Plows, of which the following is a specification.

This invention relates to plows and has for its object the provision of an improved device of this character comprising a supporting frame and a reversible standard, said standard being adapted to have mounted upon one end thereof a surface tilling plow share of the usual and well known type, and to have mounted upon the opposite end thereof a subsoiling plow share, by virtue of which construction the plow-man may plow a furrow from one end of the field to the other turning out the soil in the usual and well known manner and when he reaches the end of the furrow he may reverse the standard to bring the subsoiling plow share into action and travel back again along the same furrow. Whereby considerable time is saved since it is not necessary to employ a separate plow or to unhitch and hitch the team to a plow of different construction.

Further objects and advantages of the invention will be set forth in the detailed description which now follows.

In the accompanying drawing Figure 1 is a perspective view of a reversible plow constructed in accordance with the invention, and Fig. 2 is a side view thereof with one of the side members of the same removed.

Like numerals designate corresponding parts in both of the figures of the drawing.

The frame of the plow is preferably formed of bar or strap iron and comprises the side members 5 and 6, said members converging at 7 and being brought together at 8 upon opposite sides of a clevis piece 9. A tiebar 10 extends between the side members at the forward end thereof. The rear portion of the side members 5 and 6 are tied together by a rod 11. The rear ends of the side members are bowed as at 12 and their terminal ends are secured by bolts or like fastening devices 13 to the handles 14 of the plow. The lower ends of these handles are bolted at 15 to side members 5 and 6 of the frame. The rod 11 provides a pivot point for a swinging standard 16. This standard is provided intermediate its ends with openings 16' adapted to be traversed by a pin 17 having a handle 18, which pin holds the standard in position when the plow is in use. At one end the standard 16 is adapted to carry a plow share 19 of the ordinary construction and at the other end a subsoiling plow share 20 of a well known form.

In operation the surface plow share 19 is first used and a furrow is opened after which the standard is reversed, the pin 17 being placed in the proper opening 16' to hold the subsoiling plow share in proper position and the plow is caused to travel back over the same furrow and the subsoiling operation is performed without the necessity of employing a different plow or a different team. This results in a considerable saving of time and labor. Particular attention is directed to the bowing of the rear ends of frame members 5 and 6 for by virtue of this construction these members are caused to form braces and attaching members for the plow handles. In addition to this they provide a mounting for the pin 17 which serves to hold the standard in its adjusted position as hereinbefore set forth.

While the elements shown and described are well adapted to serve the purposes for which they are intended it is to be understood that the invention is not limited to the precise construction set forth, but includes within its purview such changes as may be made within the scope of the appended claims.

Having described my invention what I claim is:

1. In a plow of the character described, a supporting frame comprising a pair of side members lying in a substantially horizontal plane the rear ends of said side members being bent to bow formation, a pair of handles the lower ends of which are secured to said side members intermediate the ends of the latter, the terminal ends of said side members being secured to said handles intermediate the terminal ends of the latter.

2. In a plow of the character described, a supporting frame comprising a pair of side members lying in a substantially horizontal plane the rear ends of said side members being bent to bow formation, a pair of handles the lower ends of which are secured to said side members intermediate the ends of the latter, the terminal ends of said side members being secured to said handles intermediate the terminal ends of the latter, a transverse pivot rod, a reversible standard mounted upon said pivot rod, and surface and subsoil plow shares mounted upon said standard substantially as shown and described.

3. In a plow of the character described, a supporting frame comprising a pair of side members lying in a substantially horizontal plane the rear ends of said side members being bent to bow formation, a pair of handles the lower ends of which are secured to said side members intermediate the ends of the latter, the terminal ends of said side members being secured to said handles intermediate the terminal ends of the latter, a transverse pivot rod, a reversible standard mounted upon said pivot rod, and surface and subsoil plow shares mounted upon said standard substantially as shown and described and a pin traversing the upturned portions of said side members and said standard to hold said standard in its adjusted position.

In testimony whereof I affix my signature in presence of two witnesses.

JAMES W. P. HILL.

Witnesses:
D. J. GILES,
B. B. PRICE.

---

Copies of this patent may be obtained for five cents each, by addressing the "Commissioner of Patents, Washington, D. C."